Oct. 2, 1928.
J. S. HERZON
EYEGLASS HOLDER
Filed June 11, 1925
1,686,002
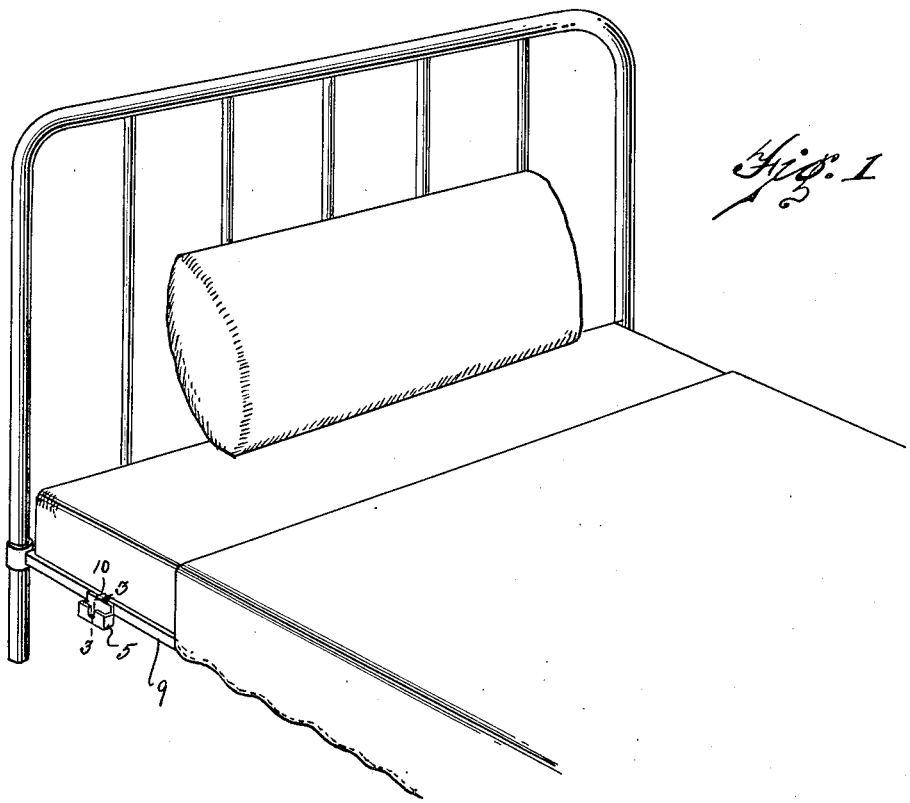
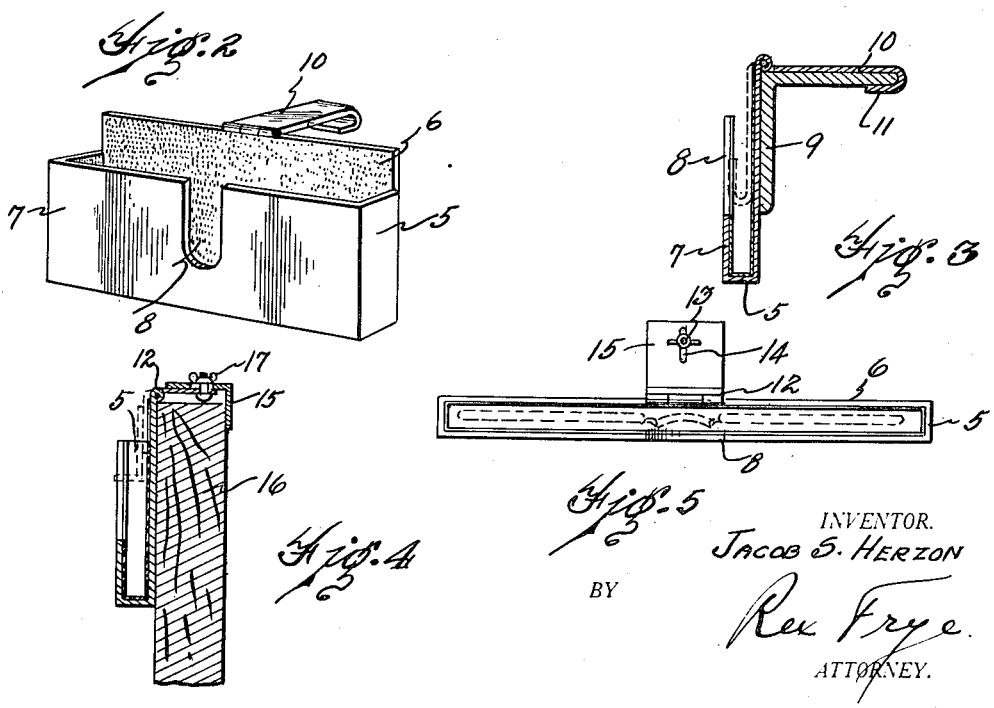
INVENTOR.
JACOB S. HERZON
BY
Rex Frye
ATTORNEY.

Patented Oct. 2, 1928.

1,686,002

UNITED STATES PATENT OFFICE

JACOB S. HERZON, OF DETROIT, MICHIGAN.

EYEGLASS HOLDER.

Application filed June 11, 1925. Serial No. 36,308.

This invention relates to receptacles for eye glasses, spectacles and the like, and has for its primary object the provision of means for supporting eye glasses, etc. within easy reach of a sleeping or reclining person. It is a well-known fact that continual users of eye glasses come to place such a reliance thereon that they are ill at ease and lack confidence in themselves whenever they are not wearing the eye glasses. When, for example, they first arise from a bed or couch their first thought is to locate their eye glasses and put them on. It is an object of my invention to facilitate their doing this, by conveniently locating a receptacle for the glasses which is so shaped and constructed that they will first contact the nose piece and not the glass portions of the spectacles.

Another object of my invention is the construction of a receptacle especially adapted to hold eye glasses and the like and having a substantially central slot in its forward wall to guide the fingers of a person attempting to remove the eye glasses into engagement with the nose piece of the eye glasses.

A further object of my invention is the provision of a portable receptacle for eye glasses and the like having adjustable means for attachment to articles of varying thickness, which attaching means may be folded within the receptacle when not in use, whereby the receptacle is adapted to rest upon a shelf or the like.

Other objects and advantages will be apparent from the following description, wherein reference is made to the accompanying drawings illustrating preferred embodiments of my invention and wherein similar reference numerals designate similar parts throughout the several views.

In the drawings:

Fig. 1 is a perspective view of my improved eye glass holder in position upon a bed.

Fig. 2 is an enlarged detail perspective view of the holder.

Fig. 3 is a central sectional view taken substantially on the line 3—3 of Fig. 1.

Fig. 4 is a central sectional view through a slightly modified embodiment of my invention, and Fig. 5 is a plan view of the embodiment illustrated in Fig. 4.

Referring now to the drawings, the numeral 5 designates a receptacle for eye glasses, spectacles and the like having a rear wall 6 preferably higher than the remaining walls of the receptacle, and a front wall 7 provided with a substantially central slot 8 for the guidance of the fingers in lifting a pair of eye glasses, etc. from the receptacle. Suitable side and bottom walls connect the rear wall 6 and front wall 7 so that the eye glasses will be retained within the receptacle in substantially vertical position, and the length of the receptacle is preferably but slightly greater than the length of a pair of eye glasses, whereby the nose piece of the eye glasses will be positioned directly behind the central slot 8 in the forward wall whenever the eye glasses are placed within the receptacle. A lining of felt or the like may be secured to the inner faces of the receptacle to prevent damage to the eye glasses.

Various means may be provided for detachably positioning the receptacle 5 upon a bed or other article. In the illustrated embodiments I have shown two methods of securing the receptacle in place. That illustrated in Figs. 1 to 3 is particularly adapted for use with the usual form of iron beds having side bars 9 of inverted L shape. A securing arm 10 is pivotally mounted to the central portion of the top of the rear wall 6 of the receptacle and is provided with a hooked portion 11 for securing over the inner edge of the upper wall of the side bar of the bed, substantially as shown in Fig. 3. In positioning my receptacle with this form of fastening means, the hooked portion 11 is first slid over the upper portion of the side bar and then the receptacle is permitted to hang vertically from its pivotal connection with the securing arm 10.

In Figs. 4 and 5 I have illustrated an adjustable form of securing means adapted for securing my improved receptacle to chairs, wooden beds, etc. A securing arm 12 is pivotally mounted to the central portion of the upper edge of the rear wall 6 of the receptacle and carries a bolt 13 adapted to extend through the elongated slot 14 in the companion securing bar 15 which is shaped to act as a clamp against the inner side of a wooden side bar 16 of a bed or other piece of furniture. The securing bar 15 is slid over the companion securing bar 12 until the proper distance has been secured between the rear wall of the receptacle and the downturned portion of the clamp 15, whereupon the thumb screw 17 is turned down on the bolt 13 to lock the movable securing bar 15 in position.

The pivotal connection of the securing means with the rear wall of the receptacle is in alignment with the slot 8 in the forward wall of the receptacle, with both forms of securing means shown, whereby the securing members may be swung into the receptacle when not in use (note dotted lines in Figs. 3 and 4). This enables the receptacle to be compactly folded for carrying in a suitcase or the like, and also permits the placing of the receptacle upon a shelf or other surface as long as desired.

In positioning the eye glasses within the receptacle, it is merely necessary that they be slid within the receptacle in a substantially vertical position. To remove the eye glasses it is merely necessary to bring the hand into contact with the receptacle and find the slot 8, whereupon one finger is inserted in the slot and an upward pull brings the finger into engagement with the nose piece of the eye glasses and lifts the eye glasses from the receptacle without the hand contacting the glass portions thereof.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

Having described my invention, I claim:

1. A receptacle for eye glasses and the like including a forward wall having a slot therein in position to permit access to the nose piece of eye glasses therein, and securing means pivotally secured to the receptacle in alignment with said slot, and adapted to swing therethrough.

2. A receptacle for eye glasses and the like including an open-topped substantially rectangular box having a forward wall with a slot therein in position to permit access to the nose piece of eye glasses therein, end walls and a rear wall spaced from the front wall, and adjustable securing means carried by the rear wall, and adapted to swing through said slot.

3. A receptacle for eye glasses and the like including a forward wall having a slot therein in position to permit access to the nose piece of eye glasses therein, a rear wall spaced from the front wall, and adjustable securing means pivotally mounted upon the rear wall in alignment with said slot and adapted to swing therethrough.

In witness whereof I hereunto set my hand.

JACOB S. HERZON.